Feb. 3, 1959 R. A. HENLE 2,872,593

LOGICAL CIRCUITS EMPLOYING JUNCTION TRANSISTORS

Filed Dec. 18, 1953 2 Sheets-Sheet 1

INVENTOR.
ROBERT A. HENLE
BY
P. E. Henninger
ATTORNEY

*INVENTOR.*
ROBERT A. HENLE
BY P. E. Henninger
ATTORNEY 2,872,593

LOGICAL CIRCUITS EMPLOYING JUNCTION TRANSISTORS

Robert A. Henle, Hyde Park, N. Y., assignor to International Business Machines Corporation, New York, N. Y., a corporation of New York Application December 18, 1953, Serial No. 399,094

1 Claim. (Cl. 307—88.5)

This invention relates to logical circuits and particularly to such circuits employing junction transistors.

There has come into wide use in recent years a type of electrical circuit commonly called a logical circuit. A logical circuit may be defined as a circuit having a plurality of inputs and a single output, which responds, upon the receipt of signals at only a certain distinctive combination or combinations of the inputs to produce a signal at its output. Signals at other combinations of the inputs produce no effect at the output. When the several inputs are controlled by separate conditions, such circuits provide a means for logical discrimination among the combinations of conditions.

While logical circuits may be used to advantage in many situations, they have been used extensively in high-speed computers. The input signals for such circuits are commonly of the pulse type, i. e., the input current or potential shifts substantially instantaneously between two separated values.

One specific type of logical circuit has come to be known as an Or circuit. In such a circuit, which would more accurately be described as an And/Or circuit, an output pulse is produced whenever an input pulse is received at any of the inputs or at a plurality of inputs simultaneously.

Another type of logical circuit is known as an And circuit. Such a circuit produces an output pulse only when input pulses are received at all the inputs simultaneously.

It is well known and understood in the art that there is no structural difference between an And circuit and an Or circuit. The difference lies only in the significance which is arbitrarily attached to the several input signals and to the output signal. This situation with respect to the structural equivalence of the And and Or circuits will be explained more completely in connection with the specific circuits described below.

The foregoing types of circuits are known in the form of vacuum tube circuits, utilizing typically either diodes or triodes. Some such circuits are also known using semiconductor diodes.

Transistors have recently come into use as relay devices broadly capable of functions similar to those of electromagnetic relays, vacuum tubes, and other devices which respond to a small input signal to control a larger output signal. Transistor current and potential characteristics are quite different from those of electromagnetic relays and of vacuum tubes, and consequently transistors cannot be directly substituted for those other relay devices in any given circuit. While the ultimate function of such a circuit using one or more transistors may be broadly equivalent to the ultimate function of a vacuum tube circuit, the structures of the two circuits are typically quite different.

Transistors are preferred to vacuum tubes and electromagnetic relays for many circuit applications because of their low power requirements, small space requirements and comparatively rapid response to input signals. Such advantages of transistors are particularly desirable in the case of circuits used in high speed computers, which require thousands of such relay devices. The advantages to be gained with respect to the power requirements and space requirements from the use of transistors in such apparatus as opposed to vacuum tubes are very obvious.

There are described and claimed in the copending application of Harold Fleisher, Serial No. 389,115, filed October 29, 1953, certain logical circuits employing point contact transistors.

Junction transistors have many characteristics which make them more desirable than point contact transistors for many applications. Among these characteristics are better stability, long life, greater power gain, greater power efficiency and greater power handling ability. They operate at a much lower power level than point contact transistors, and the supply voltages required are lower. Furthermore, the circuits are less critical with respect to transistor characteristics, i. e., with respect to variations in characteristics between transistors of the same design, and also with respect to variations with time in the characteristics of a particular transistor.

An object of the present invention is to provide improved logical circuits. A further object is to provide improved And and Or circuits.

Another object is to provide improved logical circuits employing junction transistors.

A further object is to provide circuits of the type described having a high input impedance and a low output impedance and a substantial power gain.

The foregoing and other objects of the invention are attained in the circuits described herein by providing a plurality of junction transistors, one for each of the several inputs; connecting the emitters of the several transistors to a common output circuit; connecting the several collectors to ground, and, if required, through suitable biasing mechanism; and connecting the signal generators of the several inputs to the base electrodes of the respective transistors.

Other objects and advantages of the invention will become apparent from a consideration of the following specification, claim and drawings:

Figure 1:
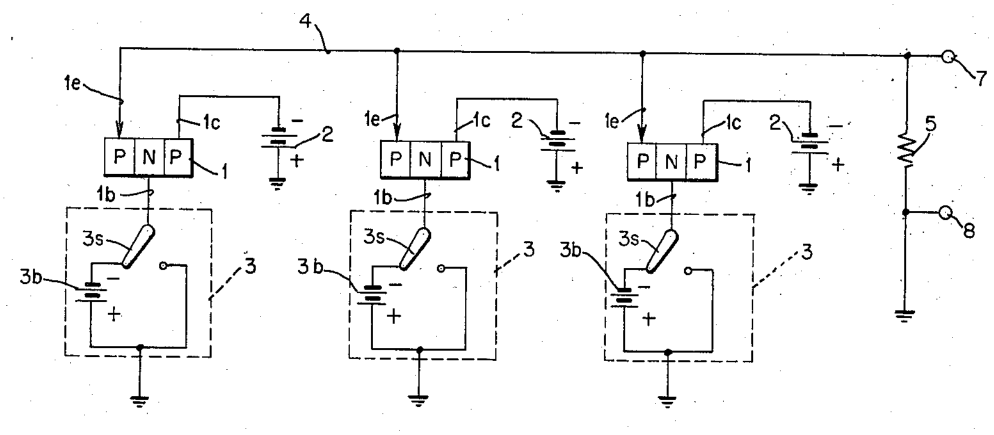
Fig. 1 is a wiring diagram of a circuit employing a plurality of PNP transistors and embodying the invention.

Referring to Fig. 1, there are shown three PNP transistors, each indicated by the numeral 1. Each transistor and its associated circuit elements is equivalent to each other transistor in this figure. Consequently, the same reference numerals are applied to all the transistors and their associated equivalent circuit elements. It is not intended, however, to indicate that the electrical characteristics of all the transistors must be identical. On the contrary, a reasonable amount of variation in the characteristics of the individual transistors is permitted.

Each transistor 1 has a base electrode **1*b*, an emitter electrode 1*e* and a collector electrode 1*c*. Each collector electrode 1*c* is biased negatively with respect to ground by means of a battery 2. Each base electrode 1*b* is connected to ground through a signal generator 3**.

The signal generator 3 is illustrated as including a single-pole, double-throw switch **3*s***. In the position of the switch 3*s* shown in the drawings, the switch connects a battery 3*b* between the base electrode 1*b* and ground, with the polarity of the battery 3*b* in a direction to bias the base negatively with respect to ground. The switch 3*s* is movable from the position shown in the drawing to a second position in which the base 1*b* is connected directly to ground.

All three of the emitter electrodes 1*e* are connected in parallel to a wire 4. A load resistance 5 is connected between the wire 4 and ground. Output terminals 7 and 8 are respectively connected to the wire 4 and to ground.

Figure 2:
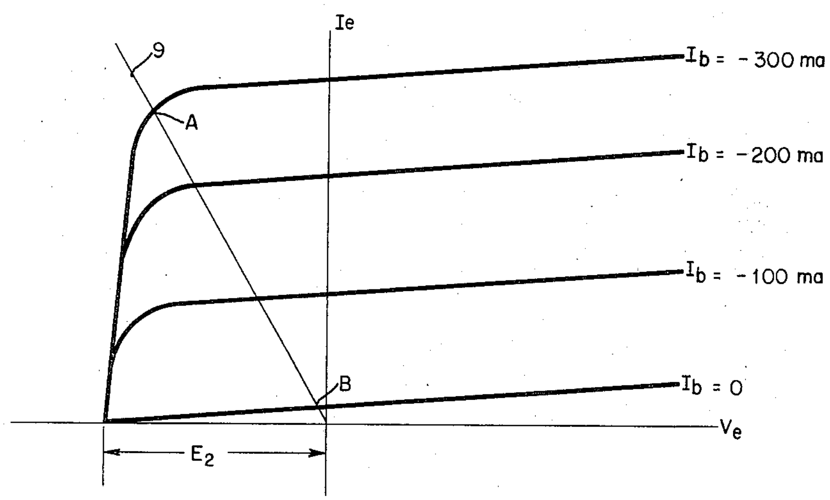
Fig. 2 is a graphical illustration of a family of emitter potential-current ($V_e$—$I_e$) characteristics of one of the PNP transistors of Fig. 1.

Fig. 2 illustrates a family of emitter current-potential characteristics of one of the transistors 1. $I_e$ represents emitter current and $V_e$ represents the potential between the emitter and ground. Each curve in the family is taken for a fixed value of base current $I_b$ (exemplary values being indicated by legend in the drawing). There is superimposed on this family of characteristics a load line 9 whose slope is determined by the impedance of the resistor 5. The location of the common zero emitter current point of all the curves with respect to the origin is determined by the terminal potential of the battery 2, as indicated by the legend $E_2$ in the drawing.

*Operation of Fig. 1*

In the following discussion of the operation of this circuit, certain values of potential will be assumed for the various batteries. It should be understood that the invention is in no way limited to these specific potential values, but that other values may be used as required.

Assume that the switches 3*s* are in the positions shown in the drawing, that each of the batteries 2 and 3*b* has a terminal potential of 5 volts. Each collector is at substantially the same potential as its base (both being at −5 volts with respect to ground). Each emitter is connected to ground through resistor 5. Each transistor is therefore conducting a substantial amount of current, which currents produce a potential drop through the load resistor 5. The current flows increase until each emitter is only slightly more positive than the potential of its associated base, namely −5 volts with respect to ground. A potential difference of approximately 5 volts then appears across the output terminals 7 and 8, the terminal 7 being negative. Each transistor is then operating at the point A in Fig. 2.

Now consider the situation when all the switches 3*s* are operated to their right-hand positions, so that the base electrodes are grounded. There is then no positive bias on any of the emitters, and the transistors are substantially cut off, each then operating at the point B in Fig. 2 . Both of the output terminals 7 and 8 are then substantially at ground potential and there is no output signal.

Consider now the operation that takes place when only one of the switches 3*s* is closed in its left-hand position, the others remaining closed in their right-hand positions. The emitter of that one transistor is initially biased positively with respect to its base and that transistor conducts a substantial quantity of emitter current. This emitter current flow through the resistor 5 produces a substantial potential drop across that resistor, which appears across the output terminals 7 and 8. The emitter current flow increases until the reduction in the emitter potential due to the drop across resistor 5 produces an equilibrium between emitter potential and emitter current. This equilibrium potential is substantially the same for one transistor as it is for all, so that the output signal is the same whether one or more of the switches 3*s* is closed in its left-hand position.

It may therefore be seen that the circuit described produces no output signal when all of the switches 3*s* are closed in their right-hand positions (all bases grounded). Furthermore, when any one or all of the switches 3*s* are closed in the left-hand positions, the circuit produces an output signal.

If the closure of a switch 3*s* in the left-hand position is considered as a positive input signal indication and the presence of a potential between the output terminals 7 and 8 is considered as a positive output signal, then the operation of the circuit may be described as typical Or circuit operation. In other words, whenever an input signal is received at one or more of the inputs, then the circuit produces an output signal.

If, on the other hand, the absence of a negative potential at each input (base) is considered as a positive input signal and the absence of a negative potential at the output terminal 7 is considered a positive output signal, then the circuit may be considered an And circuit, since all of the inputs must be in their positive signal conditions to produce a positive output signal.

It will be recognized by those skilled in the art that the structures shown for the signal generators 3 are shown by way of example only. Other signal generating mechanisms could be used, as long as they produce two equivalent electrical conditions, namely the absence of a potential between the base and ground and the presence of a potential between the base and ground.

The circuit described has the advantage of a high input impedance, i. e., the (base-collector) impedance to the incoming signal, and a low output impedance. The output impedance cannot be greater than that of the resistor 5. A power gain is achieved from the input to the output.

While separate biasing batteries 2 have been shown for all the transistors 1, it will be readily appreciated that a single biasing battery could be used with equal facility. Furthermore, while three transistors have been illustrated, it will be readily appreciated that the circuit might be expanded to use any reasonable number of transistors.

Figure 3:
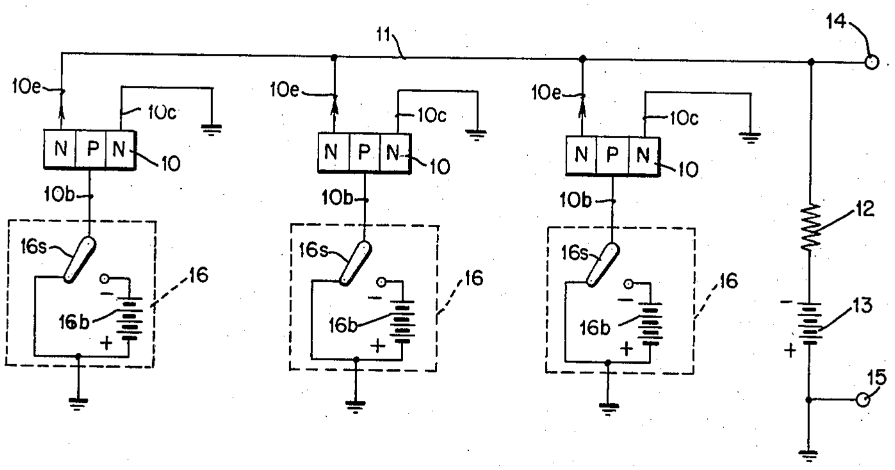
Fig. 3 is a wiring diagram of a circuit employing a plurality of PNP transistors and embodying the invention.
Figure 4:
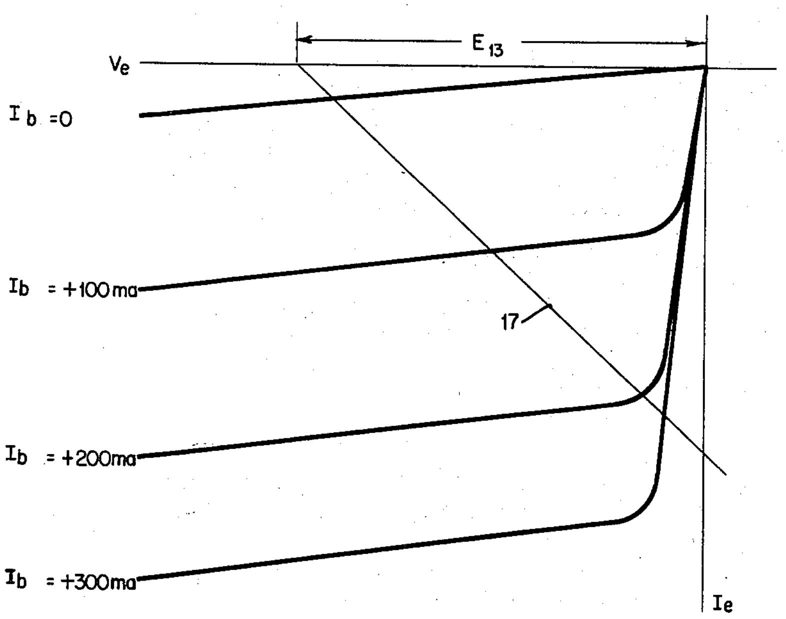
Fig. 4 is a graphical illustration of a family of emitter potential-current ($V_e$—$I_e$) characteristics of one of the NPN transistors of Fig. 3.

*Figs. 3 and 4*

The circuit illustrated in Fig. 3 includes three NPN junction transistors, each identified by the reference numeral 10. Each transistor 10 has a base electrode 10*b*, an emitter electrode 10*e* and collector electrode 10*c*. All the emitter electrodes are connected in parallel to a wire 11 which is in turn connected through a load resistor 12 and a battery 13 to ground. Output terminals 14 and 15 are respectively connected to wire 11 and to ground. All the collectors 10*c* are connected to ground. Between each base 10*b* and ground is connected a signal generator 16 including a switch 16*s* movable between the position shown in the drawing, in which the base 10*b* is connected directly to ground, and a right-hand position in which a battery 16*b* is connected between the base and ground, with its polarity in a direction to bias the base negatively with respect to ground.

There is shown in Fig. 4 a family of emitter potential-current ($V_e$—$I_e$) characteristics for one of the transistors 10 in Fig. 3. Again, $I_e$ represents emitter current, and $V_e$ represents the potential between the emitter and ground, which in this case is the same as the potential between the emitter and the collector. Each curve in Fig. 4 is taken for a fixed value of base current, for which typical values are indicated in the drawing. There is superimposed on this family of curves a load line 17, whose slope is determined by the impedance of the resistor 12 and whose location is determined by the potential of the battery 13, as illustrated at $E_{13}$ in the drawing.

*Operation of Figs 3 and 4*

As in the case of Fig. 1, certain potential values will be assumed by way of example.

Assume that the switches 16*s* are in the positions shown in the drawing, and that the potentials of all the batteries are 5 volts. Each transistor is now conducting current, since both its base and collector electrodes are grounded and a substantial negative potential is applied to its emitter. Consequently, a substantial current is flowing through the resistor 12 and a substantial output signal potential appears across the terminals 14 and 15. Terminal 14 is then at a potential substantially more positive than the negative terminal of battery 13, due to the potential drop across resistor 12. This may be defined as the "signal" condition of terminals 14 and 15.

Consider now the operation when the switches 16*s* are closed in their right-hand positions. The several bases are then at a potential (−5 with respect to ground) substantially below their collector potentials and substantially equal to their emitter potentials, so that the flow of emitter current is cut off. No current then flows through the resistor 12 and output terminal 14 is at the potential of the negative terminal of battery 13. This may be defined as the "no signal" condition of output terminals 14 and 15.

If it is now assumed that all the switches 16*s* are closed in their right-hand positions except one, and that is closed in its left-hand position, then that transistor becomes conducting and transmits current to the load comprising resistor 12. A substantial output signal potential then appears between the terminals 14 and 15.

From the foregoing, it is seen that if the presence of an input signal potential is regarded as a positive input signal, and the presence of a signal potential across the output terminals is regarded as a positive output signal, then the operation of the circuit is typical Or circuit operation. Conversely, by inverting the significance of the input signals, the circuit may be regarded as an And circuit.

As in the case of Fig. 1, other electrically equivalent signal generators may be substituted for the signal generators 16. Also as in Fig. 1, the characteristics of the several transistors 10 need not be identical. Additional transistors, each with a separate input, may be added to the three shown.

While I have shown and described certain preferred embodiments of my invention, other modifications thereof will readily occur to those skilled in the art and I therefore intend my invention to be limited only by the appended claim.

I claim:

A logical circuit comprising a plurality of junction transistors, each having a body of semiconductive material including a central zone of one extrinsic conductivity type and two end zones of the opposite extrinsic conductivity type, said zones being separated by boundary junctions, a first base electrode in ohmically conductive relation with said central zone and second and third electrodes in electrically conductive relation with said end zones, said body and the boundary junctions therein providing asymmetrically conductive current paths between said second and third electrodes and said base electrode; common output circuit means for all said transistors including a linear impedance, means directly and conductively connecting one terminal of said linear impedance to the second electrodes of all the tansistors in parallel, potential supply means connected between the other terminal of said linear impedance and the third electrodes of all said transistors, said potential supply means biasing the boundary junctions between the second electrodes and the base electrodes forwardly so that they act as emitters and biasing the boundary junctions between the third electrodes and the base electrodes reversely so that they act as collectors; and individual input circuits for each transistor connected between the respective base electrodes and a point in said common output circuit means, each said input circuit comprising a source of unidirectional signal potential shiftable at times between a signal condition in which it supplies a potential having a polarity effective to send a current through said reversely biased junction in its reverse direction and through said forwardly biased junction in its forward direction, and a no-signal condition in which it supplies no potential of that polarity, each said signal source being operable independently of the other as to the times when it shifts between its signal and no-signal conditions, said base electrodes being connected only to said input circuits so that the base electrode currents are determined only by the input signal potentials and are unaffected by current flow in the common output circuit means, and signal output terminals connected to said output circuit means at points electrically associated with opposite ends of said common load impedance, said transistors cooperating to produce a predetermined signal potential at said terminals when one or more of said signal sources is in its signal condition, and to produce a no-signal potential at said terminals when and only when all signal sources are in their no-signal conditions.

References Cited in the file of this patent

UNITED STATES PATENTS

| | | |
|---|---|---|
| 2,358,448 | Earp | Sept. 19, 1944 |
| 2,535,377 | Titterton | Dec. 26, 1950 |
| 2,557,729 | Eckert | June 19, 1951 |
| 2,600,744 | Eckert et al. | June 17, 1952 |
| 2,620,448 | Wallace | Dec. 2, 1952 |
| 2,651,728 | Wood | Sept. 8, 1953 |
| 2,655,609 | Shockley | Oct. 13, 1953 |
| 2,695,993 | Haynes | Nov. 30, 1954 |
| 2,750,456 | Waldhauer | June 12, 1956 |